July 27, 1937.  A. L. CLARK  2,087,966
HEAT INSULATED CONTAINER
Filed Nov. 27, 1935   2 Sheets-Sheet 1
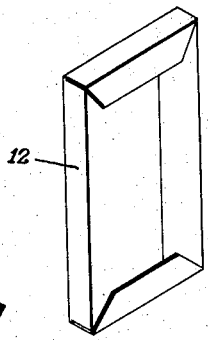
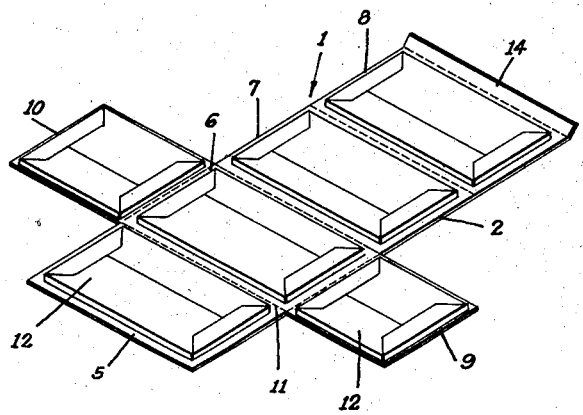
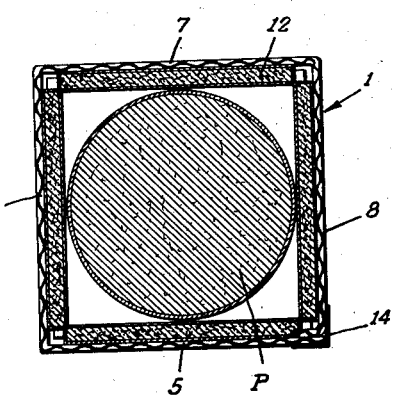
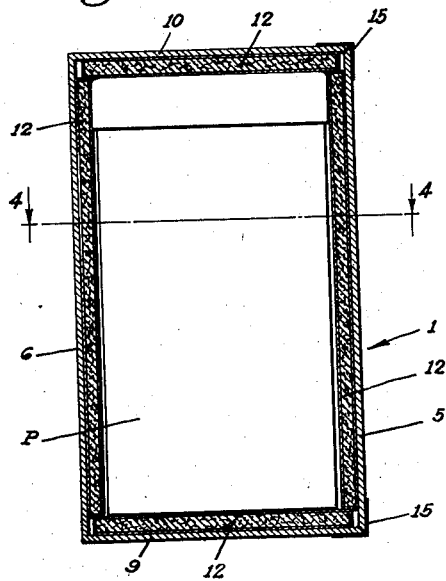
Inventor
A. L. Clark
by Hazard and Miller
Attorneys.

July 27, 1937.  A. L. CLARK  2,087,966
HEAT INSULATED CONTAINER
Filed Nov. 27, 1935  2 Sheets-Sheet 2
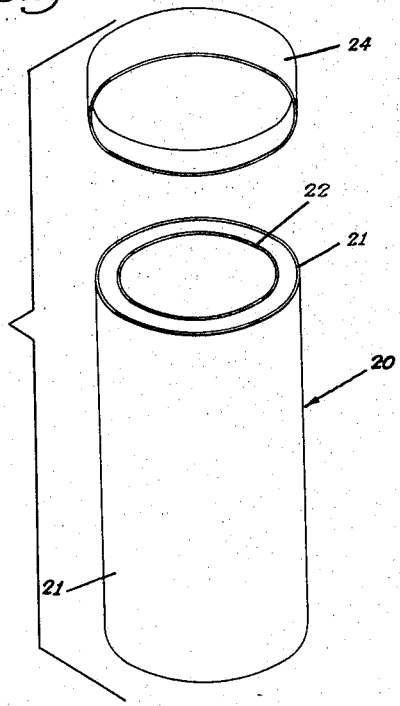
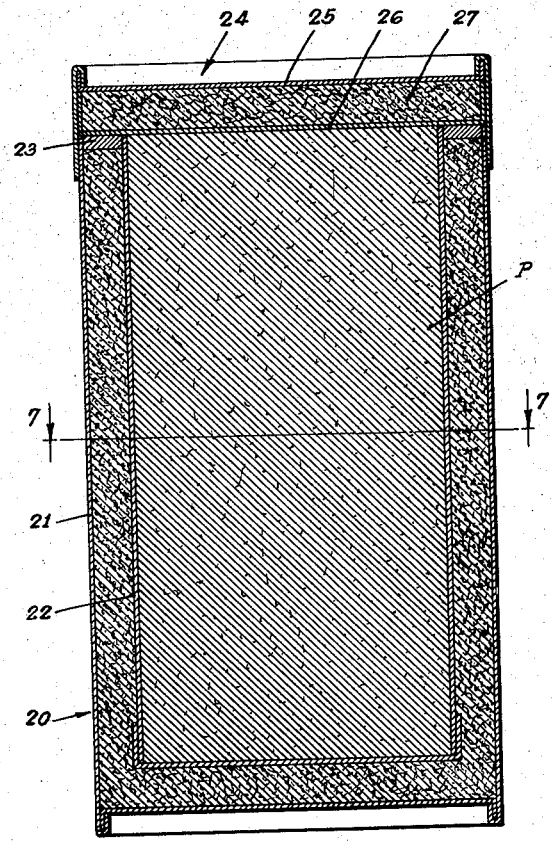
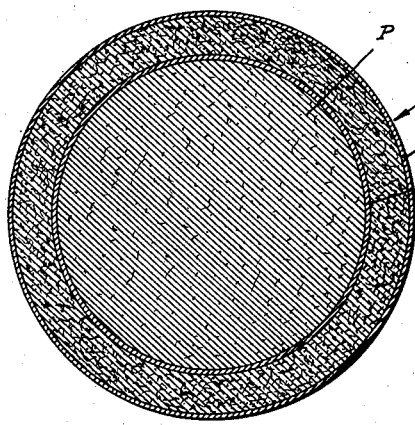
Inventor
A. L. Clark
by Hazard and Miller
Attorneys.

Patented July 27, 1937

2,087,966

UNITED STATES PATENT OFFICE 2,087,966

HEAT INSULATED CONTAINER

Arvin L. Clark, Hollywood, Calif., assignor to Charles E. Hadsell, Hollywood, Calif.

Application November 27, 1935, Serial No. 51,843

5 Claims. (Cl. 62—1)

My invention relates to a container especially intended for use to keep frozen confections, also beverages or flowers, cool for a predetermined time.

Since the commercial production of solid carbon dioxide, commonly known as "dry ice", frozen confections, such as ice cream, have been packed by placing a small quantity of "dry ice" in containers about the packages containing the ice cream. "Dry ice" is not everywhere available and, further, is objectionable in freezing the ice cream too hard. The present invention has for its object to provide a container or shell surrounding the package of the frozen confection, said shell or container having on the inside a confined layer of frozen material, said material being made of a comminuted, fibrous, absorbent substance impregnated with aqueous solution containing an agent which lowers the freezing point of water. Depending upon the length of time in which the frozen confection is to be preserved, the agent lowering the freezing point of water is proportionally increased so that the frozen stiffness of the pads at once indicates approximately the length of time in which frozen confections at their original temperature may be preserved in their frozen condition.

With the above and other objects in view, which will appear as the description proceeds, my invention consists in the construction, arrangement, and combination of parts hereinafter described and claimed.

In the accompanying drawings I have illustrated two forms by way of examples of my invention and in which:

Fig. 1 is a perspective view of a rectangular container with its panels spread out on a plane prior to its assembly.

Fig. 2 is a perspective view of one of the insulating pads secured to the side and end walls of the container.

Fig. 3 is a vertical, central section of the assembled container.

Fig. 4 is a horizontal section on the line 4—4 of Fig. 3.

In Figs. 5 to 7, inclusive, the second form of the invention is illustrated, in which:

Fig. 5 is a perspective view of the container and the lid removed therefrom.

Fig. 6 is a vertical, central section on an enlarged scale of the container of Fig. 5.

Fig. 7 is a horizontal section on the line 7—7 of Fig. 6.

Referring to the drawings: 1 indicates a fibrous sheet, such as corrugated cardboard, consisting of a rectangular body 2 divided into four equal rectangles 5, 6, 7 and 8. From one of these rectangles, in the present instance rectangle 6, extensions 9 and 10 on opposite sides and square in shape are provided which form the bottom and top, respectively, of the container when the same is folded and assembled. The rectangles 5, 6, 7 and 8, which constitute the side walls of the container, are scored from each other as indicated at 11. Also the top and bottom 9 and 10, respectively, are scored from rectangle 6.

On each of the rectangles and squares just mentioned a pad 12 is suitably secured by an adhesive or otherwise, such pad 12 being preferably made of a waterproof sheet material, such as paraffin paper, which is folded upon itself with the ends glued to the sides. The pads are filled with a comminuted, fibrous, preferably organic material, such as sawdust, paper, or cotton flock, impregnated or saturated with a liquid having a relatively low freezing point. I prefer for this purpose an aqueous solution of calcium chloride using 9½ ounces of calcium chloride to one quart of water. In place of calcium chloride, common salt or any other soluble compound, including syrups, and the like, may be used. It should be noted that the pads on the rectangles 5, 6, 7 and 8 are somewhat smaller than the rectangles themselves so that the container walls may be folded at right angles to one another without interference to form a rectangular container (see Fig. 4). The panels 12 of the end pieces 9 and 10 are of a size to rest on the upper and lower edges, respectively, of the panels 12 of the side walls so that the package P containing the frozen confection placed within the container will be entirely enclosed by the insulated pads 12. Prior to the folding and assembling operation the containers provided with the pads 12 as described are subjected to a refrigerating operation which is completed when the pads 12 are frozen rigid. The side and end walls are now folded, as will be understood, to form the rectangular container shown in Figs. 3 and 4. The package P containing the frozen confection is placed therein and the side and end walls are fastened together by means of gummed flaps 14 fast to rectangle 8 which is gummed to rectangle 5. Similarly the top and bottom 9 and 10, respectively, are fastened by means of gummed flaps 15.

It has been found that ordinary ice cream in a container shown in Fig. 3 of the same proportions as the size of the pads and having the sawdust moistened with the solution above stated will keep about eight hours at room temperatures. It will be understood that by increasing the salt content the freezing point of the pads will be lowered and consequently the frozen confection will be preserved for a longer time, other conditions being equal. Flowers will keep in the container from three to four days when a solution of seven ounces of calcium chloride to one quart of water is used. Beverages, such as beer, will keep cool using a solution of 5½ ounces of calcium chloride to one quart of water. Good results will be obtained and foods and the like will be kept cool if the sawdust is saturated with pure water and the container may so be used but the advantage of impregnating the sawdust with the liquid having a relatively low freezing point is that depending upon the quantity of salt or the like that is used it is not necessary to note any temperatures by means of thermometers for if the pads 12 are frozen solid it is at once apparent that a predetermined low degree of temperature is present. Furthermore, the sawdust acts as an excellent thermal insulator.

For ordinary purposes it is not necessary to place the container with its package of frozen confection in another cardboard container or the like but this may sometimes be advisable if further thermal insulation is desired.

In Figs. 5 to 7, another form of a container containing my invention is illustrated. In this form the container 20, which is made of waterproof sheet material, such as paraffined cardboard, is cylindrical in shape, consisting of an outer wall 21 of corrugated cardboard and an inner wall 22 which is spaced from the outer wall 20 at the side and bottom. The intervening space 22 is filled with sawdust moistened with a liquid having a relatively low freezing point, as described. A layer of paraffin or the like 23 is provided at the top between the outer and inner shells 20 and 21 to confine the moistened sawdust in place. A lid 24 is provided with double walls 25 and 26 and the space 27 therebetween is filled with the moistened sawdust.

The frozen confection, such as ice cream P, may be placed directly in the inner cylinder 22, as shown, or may be enclosed in a package and inserted within the container, as shown in connection with the form of the container illustrated in Figs. 1 to 4.

The present application is a continuation in part of my patent application for Method of packaging foods for preservation, filed April 26, 1935, Serial No. 732,251.

Various changes may be made by those skilled in the art in the construction and arrangement of parts of my container without departing from the spirit of my invention as claimed.

I claim:

1. A container comprising end and side walls made of corrugated cardboard provided on their inner faces with a layer of sawdust impregnated with a liquid having a relatively low freezing point, said layer being confined in moisture-proof sheets to form pads fastened to the end and side walls, respectively.

2. A container comprising end and side walls made of corrugated cardboard provided on their inner faces with pads fastened thereto, said pads being made of waterproof sheet material containing sawdust impregnated with a calcium chloride solution.

3. An article of the character described, comprising corrugated cardboard having four rectangular side wall panels in alignment, end wall panels extending in opposite directions from one of said panels, each panel having attached thereto a pad formed of waterproof, flexible sheets enclosing comminuted, absorbent material impregnated with a liquid having a relatively low freezing point, said pads being smaller than their respective panels so that the panels may be folded at right angles to each other to form a rectangular enclosure and gummed flaps for holding the folded panels in associated position.

4. A container comprising end and side walls provided on their inner faces with a layer of absorbent material impregnated with a liquid having a relatively low freezing point and a moisture-proof sheet confining said layer to form pads fixed to said walls.

5. A container comprising end and side walls provided on their inner faces with a layer of comminuted absorbent material impregnated with a liquid having a lower freezing point than water, said material being confined in moisture-proof sheets to form pads fastened to said walls.

ARVIN L. CLARK.